March 19, 1968  D. I. COLLINS  3,373,728
METHOD AND APPARATUS FOR HEATING STALLED ENGINES
Filed May 5, 1966
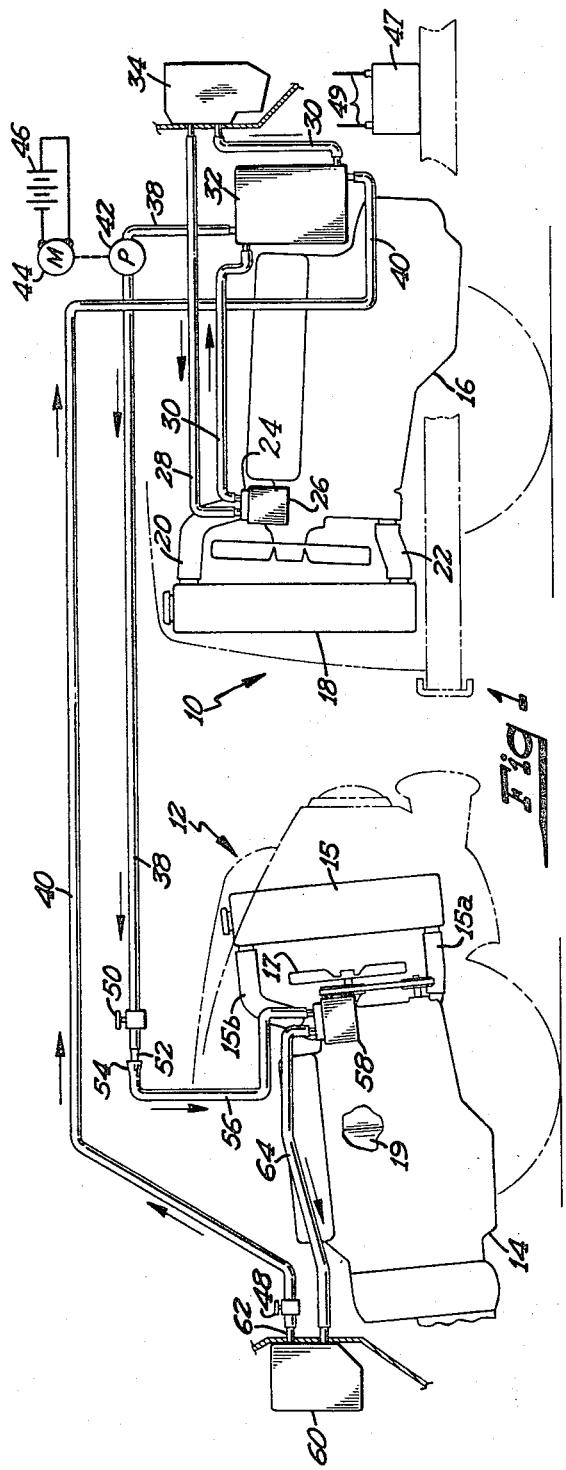
INVENTOR.
DENNIS I. COLLINS
BY
*James V. Harmon*
ATTORNEY United States Patent Office 3,373,728
Patented Mar. 19, 1968

3,373,728
METHOD AND APPARATUS FOR HEATING STALLED ENGINES
Dennis I. Collins, 5016 Morgan Ave. S., Minneapolis, Minn. 55419
Filed May 5, 1966, Ser. No. 547,823
6 Claims. (Cl. 123—142.5)

ABSTRACT OF THE DISCLOSURE

An apparatus for heating cold stalled engines which consists of a heat exchanger coupled to the cooling system of a heated engine such as the engine of a tow truck. Heat supplied by the engine of the tow truck elevates the temperature of the heat exchanger sufficiently to heat the coolant of the stalled engine connected to the heat exchanger. A pump is connected in the circuit between the heat exchanger and the stalled engine for circulating the relatively cool liquid contained in the stalled engine between the heat exchanger and the stalled engine.

---

The present invention relates to a system for starting stalled engines by heating the liquid present in the cooling system of the engine. The invention is particularly well adapted for starting of automobile engines which have been stalled as a result of cold weather.

The starting of automobile engines during cold weather has been a longstanding problem. This problem occurs when temperatures are below freezing but is most pronounced when the temperature is below 0° F. However, much lower temperatures are often experienced in many parts of the country during the early morning hours when the engine is started for the first time during the day. As a result, stalled automobiles must frequently be started with the assistance of outside electrical power connected between a source of current such as a battery and the electrical system of the stalled car. It has been found that at about 0° F. almost all stalled automobiles can be started by providing additional electric power from an outside power source, but at about —20° F. as many as one-half of the automobiles that cannot be started and require assistance will not start even though an outside source of electric power is used. In these cases, the vehicle is usually towed to a heated garage and allowed to be warmed sufficiently so that it can be started. This procedure is, however, both time-consuming and expensive. Moreover, a heated garage is not always readily available.

In an attempt to overcome these and other problems encountered in starting cold engines it has been previously proposed to provide any of various forms of heaters for elevating the temperature of the engine or the coolant employed in the engine. Frequently, a fuel such as gasoline is burned in heaters of this type and the heat produced by the burning fuel is suitably transferred to the engine or coolant. Burners of this type are relatively expensive and require a supply of gasoline or other fuel which adds to the cost of operation and presents the usual disadvantages resulting from fuel leakage, undesired combustions, gases, etc. Moreover, the burner in almost all instances must be permanently secured to the vehicle which is being heated, thus, significantly increasing the manufacturing cost of the vehicle. If, on the other hand, it is purchased as an accessory, it is an item of substantial expense to the vehicle owner.

Other proposals have been previously made for heating engines that are to be started. It has been proposed, for example, to provide both a burner and a small starter engine for starting a second much larger engine and to use the small starter engine to pump the coolant from the burner through both the smaller starting engine and the larger engine. This system has a number of substantial deficiencies insofar as it may be applied to the starting of stalled automobiles. The first is that the use of the small starter engine is highly impractical. Moreover, the provision of a fuel-consuming burner is undesirable for the reasons stated above. Furthermore, the provision of a burner and an auxiliary engine would not only require a substantial space in the engine compartment of the automobile but would constitute items of substantial expense and accordingly their application for the intended purpose of the present invention would be impractical.

In view of the deficiencies of the prior art it is one object of the present invention to provide a method and apparatus for quickly and effectively heating the engine of a stalled automobile so that it can be readily started either with or without the use of electrical power from an outside power source.

It is another object of the invention to provide a self-contained, relatively small unit adapted to be provided on a tow truck for starting stalled automobiles that fail to start when an attempt is made to start them by providing auxiliary current from a power supply provided on the tow truck.

A still further object of the present invention is the provision of a method and apparatus which is relatively low in cost, rugged in construction and reliable in operation for reliably starting the engines of stalled automobiles.

A still further object of the invention is the provision of an improved engine starting system including a means for transferring heat from the heated engine of a tow truck to a stalled engine without intermixing the coolant of the two engines.

A still further object of the invention is the provision of an improved system for heating a stalled engine of a vehicle including a provision for transferring heat to the portion of the coolant contained in the engine block of the stalled engine without heating that portion of the coolant contained in the radiator.

These and other more detailed and specific objects will become apparent in view of the following specifications and accompanying drawings wherein:

FIGURE 1 is a semi-diagrammatic side elevational view of an engine heating system in accordance with one preferred form of the invention.

FIGURE 2 is a partial side elevational view partly broken away of the hose connectors employed in accordance with the invention.

FIGURE 3 is a side elevational view partly broken away of the heat exchanger employed in accordance with the invention on an enlarged scale relative to FIGURE 1.

FIGURE 4 is a partial side elevational view partly broken away of the coolant pump of the stalled engine and its associated ductwork.

FIGURE 5 is a schematic flow diagram in accordance with a preferred form of the invention.

Briefly stated, in accordance with the present invention a heat exchanger is coupled to the cooling system of a heated engine such as the engine of a tow truck. Coupled to the heat exchanger are two ducts such as two relatively long hoses. A pumping means is operatively associated with these hoses for circulating a coolant through the heat exchanger in heat conductive relationship with the coolant employed in the heated engine. When the invention is in use, the hoses are coupled to the cooling system of the stalled engine. In accordance with a preferred form of the invention, the ducts are coupled between the pump and the engine block of the stalled engine and optionally in communication with the passenger compartment heater but are maintained out of communication with the engine radiator by a thermostatic valve employed in the stalled engine. Accordingly, the ducts from the heat exchanger are preferably coupled in series with the coolant pump of the stalled engine, the stalled engine block coolant storage chambers and if desired the passenger compartment heater. In this manner, a fluid heated in the heat exchanger is circulated through the block of the stalled engine but the thermostatic valve which is closed prior to starting of the stalled engine will prevent circulation of the hot fluid through the engine radiator thereby heating the engine in a minimum of time.

The temperature of the stalled engine need not reach the temperature of a hot engine nor need it reach the temperature of the coolant circulating through it. I have discovered that the invention is highly effective when the engine has been heated to only about 0° F. However, in the event that a higher temperature is either desired or necessary, continued operation will in a short time heat the stalled engine up to approaching the temperature of the tow truck engine. I have found, for example, using a heat exchanger employing ten feet of one-half inch diameter coiled copper tubing and a pump having a capacity of 4.6 gallons per minute that a three gallon container of engine coolant at about 35° F. could be heated sufficiently to feel warm to the touch in a period of three to four minutes and was very hot after a period of about six minutes. It was found that the stalled engine of an automobile could be effectively heated sufficiently to be readily started in a period of about four to eight minutes depending upon the particular conditions. When the temperature is moderate as from about −10° to about +10°, shorter operating times are generally required. From about three to eight minutes is typical. When the temperature is relatively low as from −10° to −40° F. somewhat longer times are required as from about five to fifteen minutes.

Refer now to the figures which illustrate by way of example the preferred form of the invention. As can be seen in the figures, there is provided a tow truck indicated generally at 10 and vehicle 12 having a stalled engine 14. The engine 14 is connected to a conventional radiator 15 by means of hoses 15a and 15b and is provided with a radiator fan 17 and a coolant reservoir 19 all of which are entirely conventional. The engine 16 of the tow truck 10 is, of course, heated and is preferably operated at a relatively high temperature as will be described more fully hereinbelow. The engine of the vehicle 10 also includes a radiator 18 connected by means of hoses 20 and 22 to the engine 16. Between the hose 20 and the engine block 16 is provided a conventional thermostatic valve assembly 24 of well known construction. The valve 24 is preferably set for a high temperature operation as from 185° to 200° F.

The engine 16 includes a pump 26 for circulating the coolant present in the engine 16 and radiator 18 through the engine, the radiator and through a pair of ducts 28 and 30 through a heat exchanger 32 which is connected in series with the compartment heater 34 of the vehicle 10. During operation, the pump 26 of the engine 16 will pump the coolant through the block of engine 16, the radiator 18, hose 30, heater 34, heat exchanger 32 and hose 28. When the vehicle 10 is operating normally prior to connecting it to the cold engine, the valve 24 will frequently be partially or completely open.

The heat exchanger 32 includes a pipe 36 connected in heat exchange relationship with the duct 30 as seen in FIGURE 3. In this instance the pipe 36 is made of a somewhat larger diameter than the pipe 30 and is positioned over pipe 30 to provide counter-current flow heat exchange. Connected to the pipe 36 is an outlet duct such as hose 38 and an inlet duct comprising a hose 40.

A pump 42 driven by means of a motor 44 connected to a battery 46 is provided in the line 38. A source of electrical power such as battery 47 is provided on the vehicle 10 and is preferably connected by means of conductors 49 to the ignition system of engine 14 to assist in the starting thereof.

Provided on the end of the line 38 is a suitable coupling member such as a tapered tube 52 (FIGURE 2). When the engine 14 is to be started, the small end of the tube 52 is introduced into the end 54 of a duct such as the hose 56 normally connected between the coolant pump 58 of the vehicle 12 and the passenger compartment heater 60. The free end of the hose 40 is connected as seen in FIGURES 1 and 2 to the outlet 62 of the passenger compartment 60. The vehicle 12 also includes a duct such as a hose 64 connected between pump 58 and passenger compartment heater which is not disturbed when the engine 14 is to be heated.

Coupled between the engine 14 and the hose 15b is a housing 68 having a thermostatic valve 70. When the coolant fluid passing through the pump 58 is relatively cool, the valve 70 will be closed thereby preventing circulation of coolant through the radiator 15. When, however, the coolant reaches a predetermined temperature valve 70 will open and the coolant will flow through both the radiator and the engine block 14. In accordance with the form of the invention illustrated, it should be noted that valve 70 will normally be closed and accordingly the pump 42 will function to pump the coolant through the block 14, heater 60, ducts 40 and 56 so as to heat the same without heating any of the coolant contained in the hoses 15a, 15b or the radiator 15 thereby economizing heat and enabling the engine 14 to be heated in a minimum period of time. It should also be noted that the coolant contained within the engine 16 will not be contaminated by dirt or other foreign material in the coolant of engine 14 and vice versa nor will the coolant of engine 16 be diluted by water in the event that there is no anti-freeze in the coolant of engine 14.

The operation of the apparatus of the invention will now be described. It will be assumed that the vehicle 12 is stalled and cannot readily be started by connecting its battery to the booster battery 47 provided on the tow truck 10. To employ the present invention, the hose 56 is removed from its normal position on the duct 62 of heater 60 and the tapered nozzle 52 of duct 38 is inserted in the free end thereof. The operator should then open the valve 50. The end of the hose 40 is then connected to pipe 62 and the valve 48 is opened. The operator should allow the engine 16 of the tow truck 10 to operate preferably somewhat above normal idling speed. The motor 44 is then turned on so as to operate the pump 42 and thereby transfer the coolant contained within ducts 38 and 40 through the heat exchanger 32 and through the block of engine 14 and heater 60. As soon as the relatively cold coolant from engine 14 passes through the heat exchanger 32 the rapid drop in temperature of the coolant in lines 28 and 30 will shut the valve 24 thereby drawing most of the heat generated by the engine 16 to the heat exchanger 32. Thus, by the coupling arrangement employed in accordance with the invention, heat is transmitted effectively from engine 16 to the heat exchanger 32 with relatively little loss through the radiator of the hot engine. Moreover, the flow of coolant through ducts 38, 40, 56, engine 14 and heater 60 will continue without losses through the radiator 15 since the valve 70 will be closed until the engine has reached relatively high temperatures. Accordingly, the heat carried by the coolant fluid is provided to the engine 14 where it is most needed.

A great many variations in the invention will be apparent to those skilled in the art once the principles of this invention are understood. The invention is limited only by the appended claims.

I claim:

1. An apparatus for starting a cold engine having a liquid cooling system including a coolant reservoir and a liquid coolant therein comprising in combination,
   (a) a heated engine having a fluid circulating in a fluid cooling system, (b) a heat exchanger operatively associated with the fluid cooling system of the heated engine, (c) duct means communicating with the heat exchanger for transferring the liquid coolant of the cold engine through the heat exchanger in heat transfer relationship to said fluid of the heated engine, (d) means adapted to connect the duct means to the coolant reservoir of the cold engine, and (e) a means for continuously circulating the liquid coolant from the cold engine through the heat exchanger and back to the cold engine.

2. The apparatus according to claim 1 wherein shut off valves are provided on the duct means for preventing the loss of liquid coolant therefrom when said hoses are disconnected.

3. The apparatus according to claim 1 wherein said cold engine includes (a) a radiator, (b) a thermostatic valve communicatively connected between the radiator and the reservoir, and (c) said duct means is connected to the reservoir of said engine so that the liquid coolant will pass through the engine reservoir without passing through the thermostatic valve whereby the closure of said thermostatic valve will prevent the loss of heat from the heated liquid coolant to the radiator.

4. The apparatus according to claim 1 wherein said cold engine comprises (a) the engine of a stalled vehicle having a passenger compartment with a compartment heater and including hoses normally connected between the cold engine and the compartment heater and wherein (b) one of said duct means is connected to the compartment heater, and (c) the other of said duct means is connected to the free end of one of said hoses which has been removed from the heater whereby the liquid coolant will flow when said circulating means is operated from one said duct into the compartment heater, thence to the coolant reservoir and through the heat exchanger.

5. The apparatus according to claim 4 wherein said heated engine comprises the engine of a tow truck.

6. The apparatus according to claim 4 wherein the heat exchanger comprises a countercurrent flow heat exchanger wherein said liquid coolant and heated fluid flow in opposite directions in heat exchange relationship, but are maintained out of fluid communication with each other whereby the fluid and liquid coolant will not be intermixed thereby preventing contamination of the fluid by the liquid coolant.

References Cited

UNITED STATES PATENTS

| | | | |
|---|---|---|---|
| 1,234,049 | 7/1917 | Lovell | 123—142.5 X |
| 1,974,907 | 9/1934 | Worth | 123—142.5 X |
| 2,716,400 | 8/1955 | Smith et al. | 123—142.5 |

EDGAR W. GEOGHEGAN, *Primary Examiner.*